June 4, 1968  W. R. WALTERS  3,386,462
LIQUID LEVEL CONTROL
Filed June 14, 1965  2 Sheets-Sheet 1
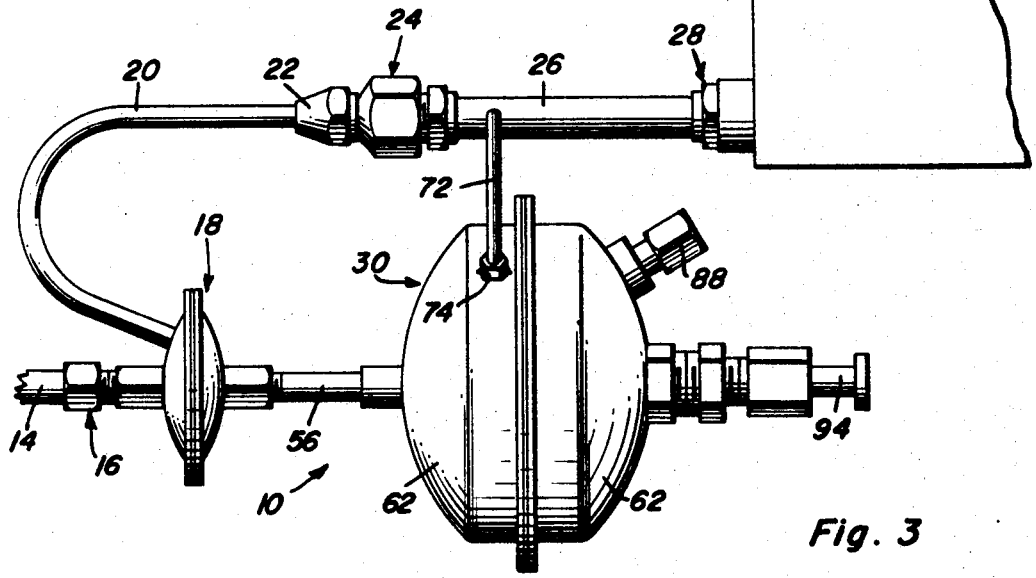
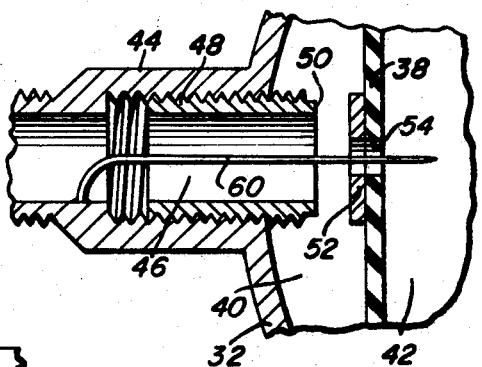
William R. Walters
INVENTOR.

William R. Walters
INVENTOR.

United States Patent Office 3,386,462
Patented June 4, 1968

3,386,462
LIQUID LEVEL CONTROL
William R. Walters, 1300 Sunset Road,
Pawhuska, Okla. 74056
Filed June 14, 1965, Ser. No. 463,694
7 Claims. (Cl. 137—244)

ABSTRACT OF THE DISCLOSURE

A differential pressure controlled system for regulating the level of liquid in a storage tank. Flow of liquid from a pressurized source is conducted to the storage tank at a regulated flow rate through a flow control valve when the inlet tank pressure is below an adjusted value. The flow control valve also conducts leakage flow to a control chamber communicating with a pressure limiting regulator to control the pressure bias exerted on the flow control valve.

This invention relates to flow control apparatus for regulating the liquid level within a liquid containing receptacle or tank.

A primary object of the present invention is to provide reliable facilities for regulating or controlling the level of liquid within a receptacle such as a stock watering tank. Accordingly, the apparatus of the present invention avoids the use of float valves and other similar devices which often malfunction because of weather conditions and damage by animals.

An additional object of the present invention is to provide a level controlling device which does not have the installational limitations heretofore associated with level controlling mechanisms. The level controlling device of the present invention may therefore be located at any suitable position either inside, outside or remote from the liquid containing receptacle over which the level control is being exerted.

A still further object of the present invention is to provide a liquid level control for liquid containing tanks which will not only cut off the inflow of liquid to the tank when a predetermined level is attained, but will also vary the liquid inflow rate in accordance with the rate at which liquid is withdrawn from the tank.

Yet another object of the present invention is to provide a liquid level control for liquid containing tanks of various types which is operative in a noiseless manner, and will prevent siphoning of liquid from the tank when there is no inlet supply pressure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the apparatus associated with the present invention.

FIGURE 2 is an enlarged partial sectional view through a portion of the apparatus shown in FIGURE 1.

FIGURE 3 is a still further enlarged sectional view of a portion of the flow control valve illustrated in FIGURE 2.

Figure 4:
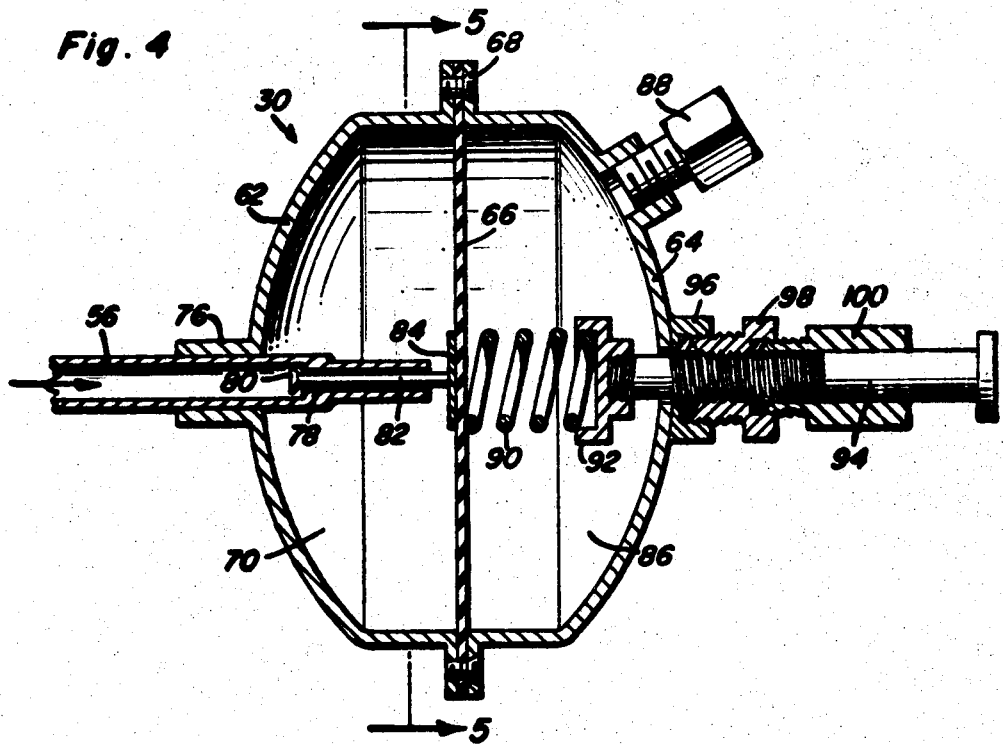
FIGURE 4 is an enlarged sectional view of another portion of the apparatus illustrated in FIGURE 1 showing the regulator portion of the apparatus.

Referring now to the drawings in detail, FIGURE 1 shows the liquid level controlling apparatus generally denoted by reference numeral 10 in association with a liquid containing receptacle 12. As hereinbefore indicated, the liquid level controlling apparatus may be located at any desired position either inside the tank, or outside thereof as illustrated in FIGURE 1. Fluid is supplied through the apparatus to the receptacle 12 from a supply conduit 14 which is connected by the coupling 16 to a flow control valve generally referred to by reference numeral 18. The flow control valve is therefore connected to the receptacle or tank 12 by a conduit arrangement including a discharge tube 20 connected by the flare nut 22, and the coupling 24 to an inlet manifold 26 having a constant flow area which dimensionally exceeds that of the discharge tube 20. Accordingly, a reduction in pressure of the liquid occurs as it flows from the discharge tube 20 into the manifold 26 connected by the coupling 28 to the tank 12. The flow rate of liquid into the tank is therefore controlled by the flow control valve 18 for the purpose of maintaining a predetermined level of liquid within the tank 12. Toward this end, the level control apparatus includes a pressure regulator assembly generally referred to by reference numeral 30 which is operatively connected to the flow control valve for controlling its operation in accordance with the principles of the present invention.

Referring now to FIGURES 2 and 3, it will be observed that the flow control valve 18 includes a front plate 32 and a back plate 34 enclosing a valve chamber therebetween. The plate member 32 and 34 are therefore provided with opposed annular flange portions interconnected by the fasteners 36. A pressure sensing diaphragm 38 is anchored between the plate members by the fasteners so as to divide the valve chamber into a flow section 40 and a control section 42. Connected to the front plate member 32, is an inlet portion 44 having an externally threaded end connected to the supply conduit 14 by the coupling 16. The inlet portion is therefore provided with an inlet passage 46 and has an internally threaded portion for removably receiving an externally threaded tubular valve seat member 48. The tubular member 48 is formed at the axial end 50 with a valve seat adapted to be engaged by a valve element 52 mounted on the diaphragm 38 so as to block flow of liquid through the inlet passage 46 into the flow chamber section 40 of the valve assembly 18. It will therefore be apparent, that when the diaphragm 38 is disposed in the position illustrated in FIGURES 2 and 3, fluid communication will be established between the inlet portion 44 of the control valve and the flow chamber section 40 so that liquid may be supplied to the discharge tube 20 connected to the front plate member 32.

Restricted fluid communication is also established between the chamber sections 40 and 42 through an orifice port 54 formed in the valve element 52 and the diaphragm 38. A restricted flow of liquid therefore may proceed into the chamber section 42 in order to influence the pressure therein jointly with the regulator assembly 30 connected to the chamber 42 by means of a control pressure passage member 56. The plate member 34 is therefore provided with an internally threaded coupling portion 58 by means of which the flow control valve assembly 18 is connected to the passage member 56. Also, in order to prevent blockage of the restricted flow through the orifice port 54, by solids that may be carried with the liquid, a cleaning needle 60 is secured internally of the inlet portion 44 and projects through the orifice port.

Figure 5:
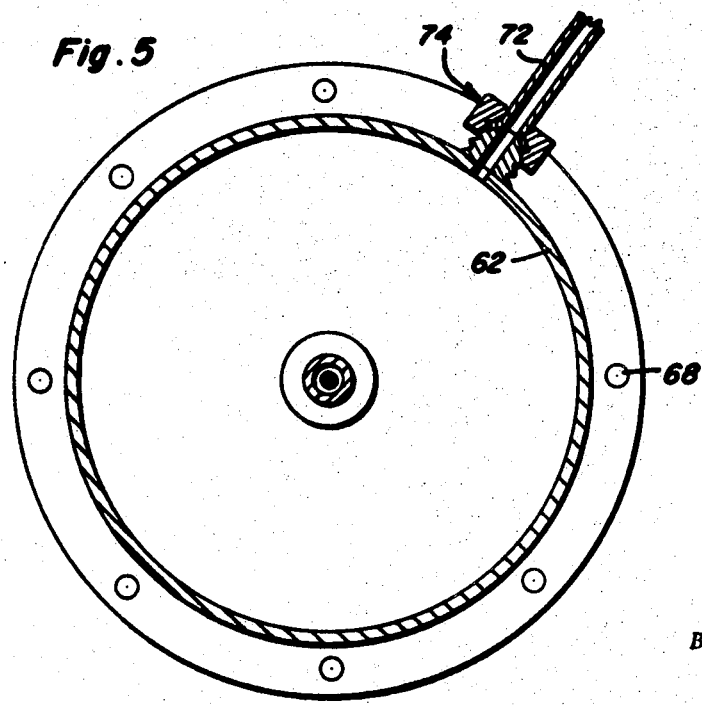
FIGURE 5 is a transverse sectional view taken substantially through a plane indicated by section line 5—5 in FIGURE 4.

Referring now to FIGURES 4 and 5 in particular, it will be observed that the regulator assembly 30 includes a pair of housing sections 62 and 64 which are separated by a pressure sensing diaphragm 66. The housing sections and the diaphragm 66 are secured in assembled relation by a plurality of fasteners 68 which extend through annular flange portions of the housing sections. The housing sections therefore enclose on one side of the diaphragm 66, a pressure chamber 70 adapted to form a reservoir for liquid. Also, the pressure within the chamber 70 is equalized with that of the pressure in the inlet manifold 26 by means of an equalizer conduit 72 connected to the manifold 26 and to the housing section 62 by the coupling assembly 74. The housing section 62 is also provided with an axially projecting portion 76 through which the passage member 56 extends into the chamber 70. Accordingly, fluid communication is established through the passage member 56 between the chamber section 42 in the flow control valve 18 and the pressure chamber 70 of the pressure regulator 30.

The end portion of the passage member 56 within the pressure chamber 70, forms a valve seat 78 for a valve element 80 having a valve stem 82 anchored by the element 84 to a central portion of the pressure diaphragm 66. Thus, when a predetermined pressure is established within the pressure chamber 70, the diaphragm 66 will be displaced in a right hand direction as viewed in FIGURE 4 in order to close the regulator valve 80. Fluid communication between the control chamber section 42 and the pressure chamber 70 will then be blocked so that a back pressure will develop within the chamber section 42 in view of the continued restricted supply of liquid through the orifice port 54 causing the diaphragm 38 to be displaced in a valve closing direction. Therefore, as long as the regulator limit valve 80 is maintained in the open position illustrated in FIGURE 4, a balanced condition is maintained so that the inlet pressure of the liquid supplied to the flow control valve 18 will maintain the flow control valve open. Displacement of the regulator valve 80 in a closing direction in order to variably reduce flow through the flow control valve 18 is controlled by facilities within a pressure limiting chamber 86 on the other side of the diaphragm 66 enclosed by the housing section 64. The housing section 64 encloses therefore the air chamber 86 adapted to be vented to atmosphere through the air vent device 88. A pressure limiting spring member 90 engages the diaphragm 66 in order to bias the regulator valve 80 toward its open position. The spring member is therefore seated within a spring retainer element 92 adapted to be adjustably positioned within the chamber 86 by means of an adjusting shaft 94 extending through an opening in the housing section 64. An internally threaded nut member 96 is therefore welded to the housing section for threadedly receiving a packing gland 98. The packing gland 98 is also internally threaded onto an externally threaded portion of the adjustment shaft 94 connected to the spring seating member 92. Accordingly, the position of the adjustment shaft 94 may be adjusted by rotation thereof after which it is locked in adjusted position by a packing nut 100 rotatably mounted thereon and having an externally threaded portion received in the packing gland 98. It will therefore be apparent, that the bias of the spring member 90 may be adjusted in order to prescribe the pressure limit at which the pressure within the chamber 70 will displace the regulator valve 80 in a valve closing direction resulting in the development of a back pressure in the chamber section 42 of the flow control valve as aforementioned in order to variably reduce the flow rate through the flow control valve.

From the foregoing description, the construction and installation of the liquid level controlling apparatus will be apparent. Operation of the apparatus will therefore also become apparent. Assuming that the liquid containing tank 12 is at a level below that for which it is adjusted by the position of the spring adjusting shaft 94, liquid at an inlet pressure will then enter the flow control valve 18 establishing fluid communication with the discharge tube 20 through the chamber section 40. As the liquid enters the inlet manifold 26, its pressure is reduced and will be substantially that of the liquid pressure within the receptacle 12 at the location to which the manifold 26 is attached. The pressure within the inlet manifold 26 will therefore reflect the level of the liquid within the receptacle. The pressure within the inlet manifold 26 will therefore also prescribe the pressure within the pressure chamber 70 of the regulator assembly 30 because of the equalizer conduit section 72. Thus, as liquid is filling the tank 12 to raise the level therein, the regulator valve 80 will be maintained open by the bias of the spring 90 so as to establish a pressure balance between the pressure of the liquid in the chamber section 40 of the flow control valve and the pressure in the control chamber 42 connected by the passage member 56 to the pressure chamber 70 in the regulator. As long as a predetermined pressure differential exists between the inlet pressure and the pressure in the tank 12, representative of a level below the predetermined level, the pressure sensing diaphragm 38 within the flow control valve will hold the valve element 52 open in order to rapidly fill the tank. When however, the liquid within the tank approaches the predetermined level, an elevated pressure will be established within the pressure chamber 70 overcoming the bias of the spring member 90 so as to displace the regulator valve 80 in a valve closing direction. The restricted flow of liquid through the orifice port 54 into the chamber section 42 of the flow control valve will cause the development of a back pressure as the passage member 56 is closed off from the regulator chamber 70 causing displacement of the diaphragm 38 and the valve element 52 mounted thereon in a valve closing direction. Accordingly, the flow rate through the flow control valve 18 is variably reduced until the inflow to the chamber 40 is completely blocked by the valve element 52 as the predetermined level within the receptacle 12 is reached.

Should liquid be withdrawn from the tank after its predetermined level has been reached, the corresponding reduction of pressure within the regulator chamber 70 will variably open the regulator valve 80 so as to reduce the back pressure within the chamber section 42 of the flow control valve in order to variably open the valve element 52. Accordingly, liquid will then be supplied through the flow control valve at a flow rate dependent upon the rate at which liquid is withdrawn from the tank 12. It will therefore be apparent, that the flow control valve will be operative to regulate the flow rate of liquid into the receptacle in response to approach or departure of the liquid from a predetermined level. On the other hand, when the level within the tank is considerably below the predetermined level, the flow control valve will be fully opened so as to accommodate rapid filling of the tank. Also, when there is no inlet pressure at the flow control valve, any leakage of liquid from the tank reducing the pressure in the regulator chamber 70 will cause the regulator valve 80 to open. Thus, the pressure of the liquid stored within the regulator chamber 70 will be operative to pressurize the chamber section 42 within the flow control valve and thereby hold the valve element 52 closed. Siphoning of liquid from the tank back through the supply conduit 14 is thereby prevented.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a liquid containing receptacle, a liquid level controlling apparatus comprising, a flow control valve having an inlet portion adapted to be connected to a supply of liquid at an inlet pressure, inlet conduit means connecting said flow control valve to the receptacle for conducting liquid into the receptacle, pressure sensing regulator means operatively connected to the flow control valve and the conduit means for varying the flow rate of said liquid into the receptacle in response to approach and departure of the liquid in the receptacle from a predetermined level, said flow control valve comprising, a valve chamber, a diaphragm dividing said chamber into a flow section connected to said inlet portion and a control section connected to said pressure sensing regulator means, a valve element mounted on said diaphragm having an orifice establishing restricted fluid communication between said sections of the valve chamber and a valve seat mounted by the inlet portion and engageable by the valve element to block flow of liquid into the flow section of the valve chamber, said flow section being connected to the conduit means for establishing fluid communication between the inlet portion of the flow control valve and the conduit means when the valve element is unseated from the valve seat by the diaphragm, a cleaning needle mounted by the inlet portion and projecting through said orifice in the valve element to prevent passage of flow blocking solids therethrough, said inlet conduit means comprising, a discharge tube connected to the flow section of the flow control valve and an inlet manifold having a flow area larger than that of the discharge tube connecting the discharge tube to the receptacle, said pressure sensing regulator means comprising, a regulator housing, a pressure sensing element mounted within said housing enclosing a pressure chamber therein, a pressure equalizer connecting said pressure chamber to the inlet manifold of the conduit means, a control passage member connecting said housing to the flow control valve, regulator valve means connected to the pressure sensing element and mounted within the control passage member for establishing fluid communication between the pressure chamber and the control section of the flow control valve, and adjustable biasing means operatively engageable with the pressure sensing element for preventing displacement of the regulator valve means in a closing direction until a predetermined pressure is established in the pressure chamber.

2. In combination with a liquid containing receptacle, a liquid level controlling apparatus comprising, a flow control valve having an inlet portion adapted to be connected to a supply of liquid at an inlet pressure, conduit means connecting said flow control valve to the receptacle for conducting liquid into the receptacle at a regulated flow rate, and pressure sensing regulator means operatively connected to the flow control valve and the conduit means for varying the flow rate of said liquid into the receptacle in response to approach and departure of the liquid in the receptacle from a predetermined level, said conduit means comprises, a discharge tube connected to the flow control valve conducting liquid therefrom under said inlet pressure and a manifold having a flow area larger than that of the discharge tube connecting the discharge tube to the receptacle.

3. In combination with a liquid containing receptacle, a liquid level controlling apparatus comprising, a flow control valve having an inlet portion adapted to be connected to a supply of liquid at an inlet pressure, inlet conduit means connecting said flow control valve to the receptacle for conducting liquid into the receptacle, and pressure sensing regulator means operatively connected to the flow control valve and the conduit means for varying the flow rate of said liquid into the receptacle in response to approach and departure of the liquid in the receptacle from a predetermined level, said conduit means comprising, a discharge tube connected to the flow control valve and an inlet manifold having a flow area larger than that of the discharge tube connecting the discharge tube to the receptacle, said pressure sensing regulator means comprising, a regulator housing, a pressure sensing element mounted within said housing enclosing a pressure chamber therein, a pressure equalizer connecting said pressure chamber to the inlet manifold of the conduit means, a control passage member connecting said housing to the flow control valve, regulator valve means connected to the pressure sensing element and mounted within the control passage member for establishing fluid communication between the pressure chamber and the flow control valve, and adjustable biasing means operatively engageable with the pressure sensing element for preventing displacement of the regulator valve means in a closing direction until a predetermined pressure is established in the pressure chamber.

4. In combination with a liquid containing receptacle, a liquid level controlling apparatus comprising, a flow control valve having an inlet portion adapted to be connected to a supply of liquid at an inlet pressure, unrestricted conduit means connecting said flow control valve to the receptacle for conducting liquid into the receptacle, valve actuating means connected to the flow control valve and responsive to a pressure differential between said inlet pressure and liquid pressure in the conduit means for opening said flow control valve, and pressure limiting means responsive to development of a predetermined liquid pressure in the receptacle for reducing said pressure differential to variably restrict flow through the flow control valve.

5. The combination of claim 4 wherein said flow control valve comprises, a valve chamber, a diaphragm dividing said chamber into a flow section connected to said inlet portion and a control section connected to said pressure sensing regulator means, a valve element mounted on said diaphragm having an orifice establishing restricted fluid communication between said sections of the valve chamber and a valve seat mounted by the inlet portion and engageable by the valve element to block flow of liquid into the flow section of the valve chamber, said flow section being connected to the conduit means for establishing fluid communication between the inlet portion of the flow control valve and the conduit means when the valve element is unseated from the valve seat by the diaphragm.

6. The combination of claim 4 wherein said pressure limiting means comprises, a pressure chamber in fluid communication with the inlet conduit means, passage means establishing fluid communication between the valve actuating means and the pressure chamber, limit valve means responsive to development of a predetermined pressure in the pressure chamber for blocking flow through said passage means, and means responsive to blockage of flow through the passage means for displacing the valve actuating means in a valve closing direction to close the flow control valve.

7. In combination with a liquid containing receptacle, a source of liquid under pressure and a flow control valve for conducting a regulated flow of liquid from the source to the receptacle, a pressure sensing regulator comprising a housing, a pressure sensing element enclosing a pressure chamber within the housing, means connecting the pressure chamber to the receptacle for applying the static pressure of the liquid to the pressure sensing element, a conduit connecting the pressure chamber to the flow control valve, regulator valve means connected to the pressure sensing element for blocking flow through the conduit to close the flow control valve, and pressure limiting means operatively engageable with the pressure sensing element for preventing blocking of the conduit by said regulator valve means until a predetermined pressure is established in the pressure chamber.

References Cited
UNITED STATES PATENTS

| | | | |
|---|---|---|---|
| 1,435,067 | 11/1922 | Hurst | 251—35 |
| 2,471,328 | 5/1949 | Jones | 137—413 X |
| 2,655,172 | 10/1953 | Owens | 137—413 |
| 2,736,337 | 2/1956 | Parks et al. | 137—492.5 |
| 3,058,485 | 10/1962 | McQueen | 137—403 |

WILLIAM F. O'DEA, *Primary Examiner.*

D. R. MATTHEWS, *Assistant Examiner.*